United States Patent [19]

Kallenbach

[11] Patent Number: 5,033,504
[45] Date of Patent: Jul. 23, 1991

[54] AUTOMATIC RELIEF VALVE

[75] Inventor: Dieter H. F. Kallenbach, Chartwell, South Africa

[73] Assignee: BPH Patent Holding AG, Zug, Switzerland

[21] Appl. No.: 469,359

[22] Filed: Jan. 24, 1990

[30] Foreign Application Priority Data

Jan. 25, 1989 [ZA] South Africa .................. 89/0570
Mar. 3, 1989 [ZA] South Africa .................. 89/1648

[51] Int. Cl.$^5$ ............................................ F16K 17/18
[52] U.S. Cl. ............................ 137/493.1; 137/526; 137/846
[58] Field of Search .............. 137/102, 493, 493.1, 137/493.2, 526, 846, 849

[56] References Cited

U.S. PATENT DOCUMENTS

| | | | |
|---|---|---|---|
| 1,038,685 | 9/1912 | Titus | 137/526 |
| 2,431,457 | 11/1947 | Bondurant | 137/526 X |
| 3,086,542 | 4/1963 | Mosier | 137/102 |
| 3,941,149 | 3/1976 | Mittleman | 137/493.1 |
| 3,976,096 | 8/1976 | Kass | 137/493.2 |
| 4,458,711 | 7/1984 | Flider | 137/493.2 X |
| 4,493,339 | 1/1985 | Porter | 137/526 X |

Primary Examiner—Robert G. Nilson
Attorney, Agent, or Firm—Kilpatrick & Cody

[57] ABSTRACT

This invention relates to a relief valve used where there is an induced flow through equipment. The relief valve controls the flow through the equipment at a uniform rate and also provides for pressure relief of the liquid used in the equipment. The valve comprising a body having a flow passage therethrough with an inlet and an outlet for connection into a pipe having induced flow therethrough. A bypass passage from the body between the inlet and the outlet and open to ambient conditions at the free end is also provided. There is a flexible resilient diaphragm in the bypass passage perforated to permit flow therethrough in one direction only and the perforation variable in size dependant on the degree of flexing of the diaphragm.

5 Claims, 2 Drawing Sheets

AUTOMATIC RELIEF VALVE

FIELD OF THE INVENTION

This invention relates to relief valves for induced flow therethrough under different pressure conditions.

BACKGROUND TO THE INVENTION

Where there is an induced flow of liquid through equipment, such as for example domestic swimming pools, it is desirable that a uniform flow of liquid pass through the equipment at a controlled rate. With different pumping apparatus, that is not always easy to obtain and it is an object of the present invention to provide a valve which provides a relief flow therethrough which will vary automatically to allow constant predetermined uniform flow through apparatus.

Further in water filter apparatus like swimming pool cleaners, the water is drawn from a weir in the swimming pool and pumped through a sand based filter. The water then flows back into the swimming pool.

When the filter becomes dirty the resistance of the filter to water flow therethrough is increased.

When the pump is switched off the water in movement through the system has a certain inertia which causes the water flow in the system to reduce to zero only after a certain lapse of time. If the filter in the system is dirty the inertia of the water causes the pressure in the system to increase momentarily after switch off of the pump. This can have the effect of a reverse flow and cause fittings in the filter system to be released. Where the filter unit is connected to a pool cleaner this release can often render the cleaner inoperative.

The object of this invention is to provide a relief valve for the kind of application above referred to and a further object is to provide a relief valve which will also permit relief flow when necessary.

SUMMARY OF THE INVENTION

According to this invention there is provided a relief valve comprising a body having a flow passage therethrough with an inlet and an outlet for connection into a pipe having induced flow therethrough, a bypass passage from the body between the inlet and the outlet and open to ambient conditions at the free end; a flexible resilient diaphragm in the bypass passage perforated to permit flow therethrough in one direction only and the perforation variable in size dependant on the degree of flexing of the diaphragm.

The invention further provides for the diaphragm to be tubular and open at one end with a peripheral flange enabling the diaphragm to be retained in position in the bypass passage and having a perforation through the closed opposite end.

The invention also provides for the perforated end of the diaphragm to converge towards the longitudinal axis and for the perforation to be formed by a plurality of slits through the diaphragm extending from the axis outwardly along lines of juncture between adjacent surfaces spaced equally apart.

Still further features of the invention provide for the diaphragm to fit with clearance into the bypass to be slidable therein between a position where the peripheral flange forms a seal against the free end of the bypass passage and a position where there is a flow passage passed the diaphragm out of the bypass passage.

Further, the invention provides for the bypass passage to have longitudinal guiding means on its inner surface, for the diaphragm to have co-operating members movable in the guiding means with a restriction at the free end of the bypass passage to prevent complete withdrawal of the diaphragm from the bypass passage.

Still further the invention provides for the perforated end of the diaphragm to be of generally rounded shape with the flexible parts of the diaphragm between the slits to have stiffening ribs extending therealong.

In an alternative form the parts of the diaphragm between the slits may be made as flat surfaces.

The invention includes a diaphragm for a relief valve as defined above.

BRIEF DESCRIPTION OF THE DRAWINGS

A preferred embodiment of the invention will be described with reference to the accompanying drawings in which.

DETAILED DESCRIPTION OF THE INVENTION

Figure 1:
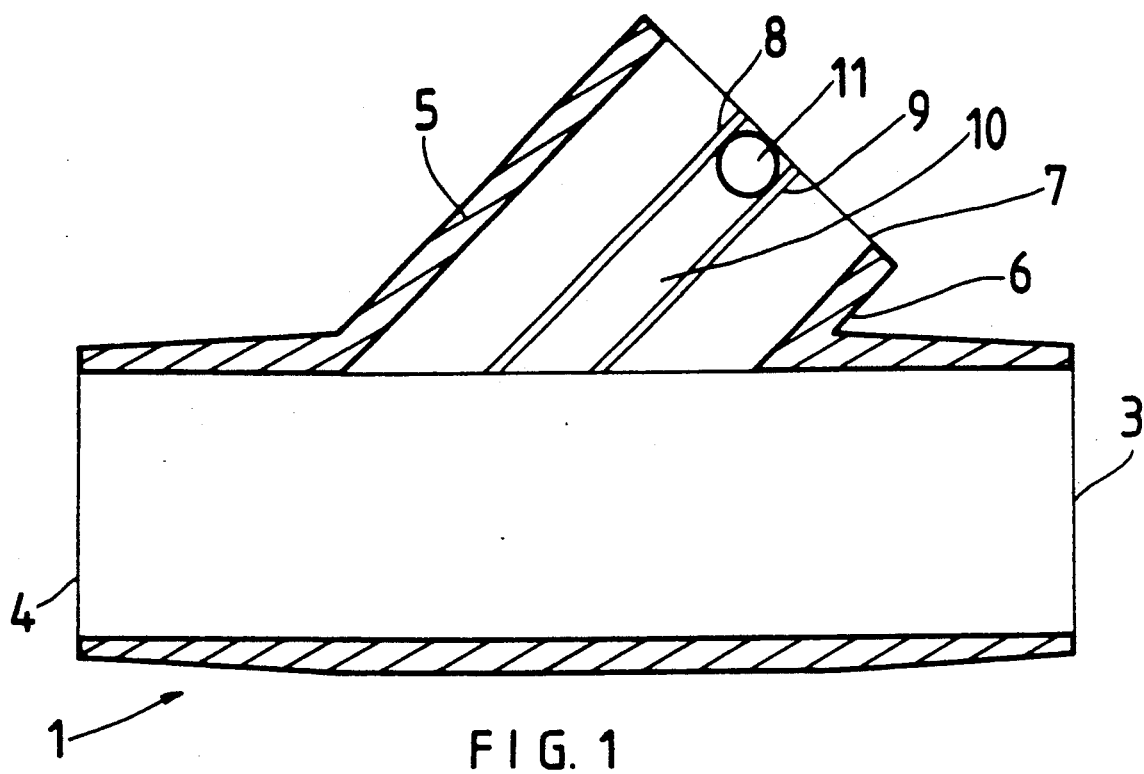
FIG. 1 is a cross-sectional view of the body of the relief valve.
Figure 2:
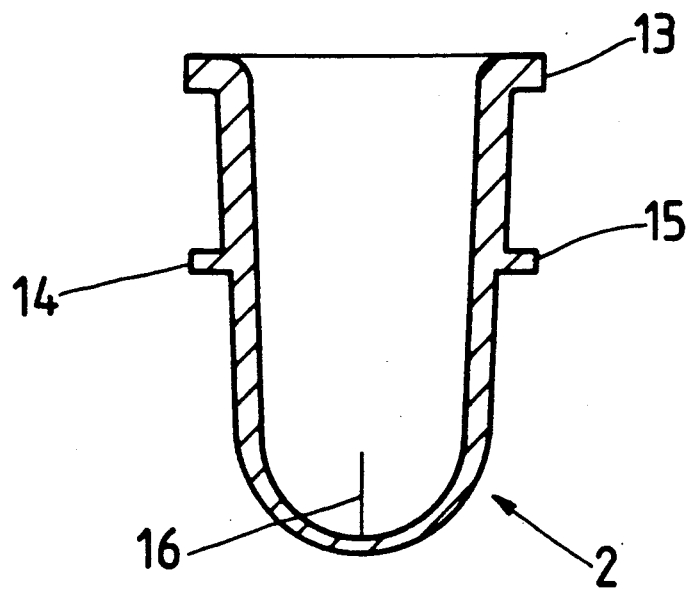
FIG. 2 is a cross-sectional view of a diaphragm according to the invention.
Figure 3:
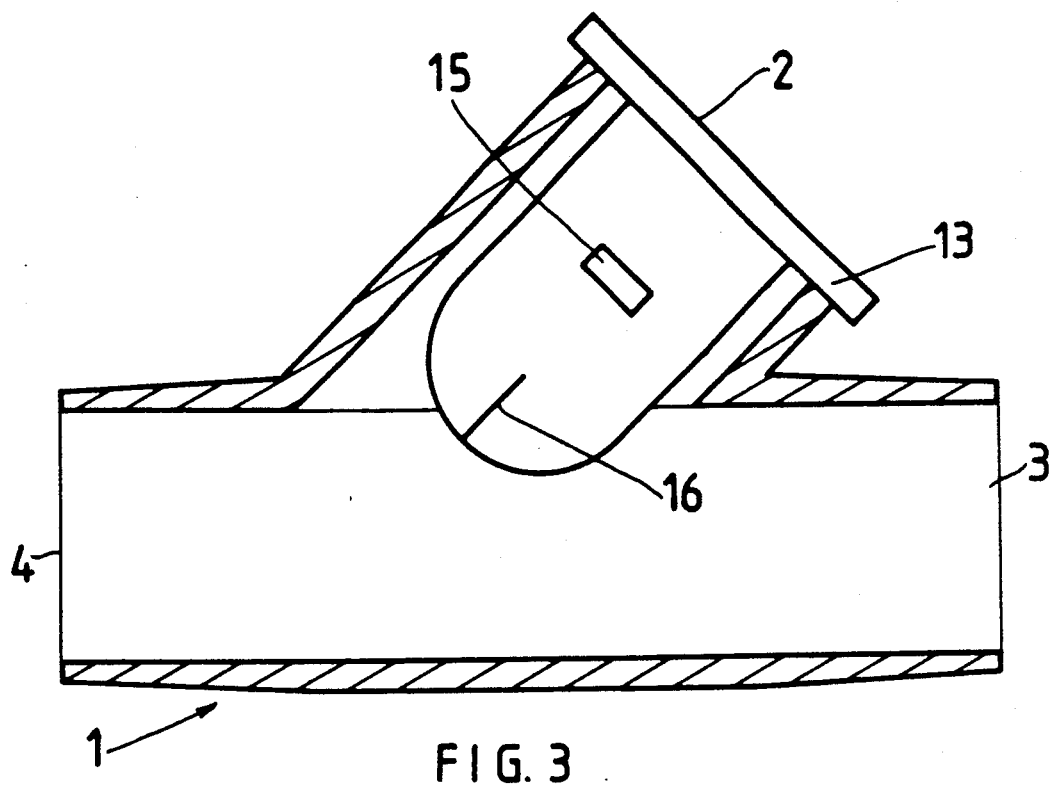
FIG. 3 is a cross-sectional view of the body of the relief valve with the diaphragm inserted.

As illustrated in FIGS. 1 to 3, a relief valve consists of a hollow body (1) and a diaphragm (2).

The body (1) has an inlet end (3) and outlet end (4). The valve is particularly suited for use with domestic swimming pool cleaners and inlet and outlet ends are tapered for insertion between contiguous lengths of the flexible hose for the pool cleaner forming the suction pipe for the filter unit for the swimming pool.

A bypass passage (5) extends at an acute angle (6) from the body and opens at end (7) to ambient conditions.

The bypass passage (5) has on its inside two longitudinal guiding ribs (8) and (9) defining a channel (10). At the open end of the channel (10) is an obstruction (11) forming a restriction across the channel. A similar channel (not shown) is provided along the opposite inside surface of the passage (5).

The diaphragm (2) has a tubular body with a peripheral flange (13) at one open end and two guiding members (14) and (15) on opposite sides on the outside of the tubular body. The other end of the body is closed and of generally rounded shape. This end has four slits intersecting at right angles across it of which only one (16) is visible in the drawings.

The diaphragm (2) is made of a flexible resilient material and therefore the four parts formed between the slits (16) can flex outwardly.

The diaphragm (2) can be inserted into the bypass passage (5) by forcing the two guiding members (14) and (15) over the obstructions (11) in channels (10). The diaphragm (2) can then slide in the bypass passage (5) between a position where the peripheral flange (13) forms a seal against the free end of the bypass passage and to an open position where the guiding members (14) and (15) come into contact with the obstructions (11) in the channels (10). In this position there is a flow passage passed the outside of the diaphragm (2) through the open end of passage (5).

When there is a flow through the body from the inlet (3) to the outlet (4) the diaphragm (2) will be sucked towards the main flow passage with flange (13) sealing on the free end of the bypass passage as indicated in FIG. 3.

The inherent designed characteristics of the diaphragm will determine the flexing of the parts between the slits and the flow therethrough under different pressure conditions existing in the body. The flexing will depend inter alia on the rigidity of the material used. Preferably the diaphragm will open to allow flow therethrough when the pressure induced in the body drops below that required to cause optimum flow through the swimming pool cleaner with which the relief valve is used.

Increased suction will cause increased flow through the diaphragm and maintain the flow through the cleaner substantially constant.

It is to be noted that the nature of the diaphragm and aperture in the end thereof will allow the opening to increase as necessary to permit the passage of debris which may be entrained in the flow through the bypass passage. This enables the relief valve to operate effectively without blockage under all normal operating conditions associated with swimming pool cleaners.

When the pump of the swimming pool cleaner is switched off, the pressure in the equipment increases momentarily because of the inertia of the flowing water. When this happens the diaphragm is free to slide away from the sealing position and to allow flow through the space between the inside of the bypass passage and the outside of the diaphragm. This will release the pressure and prevent connections in the equipment between the pool cleaner and the pump being released.

When the pump is again started the diaphragm (2) will automatically be sucked into the sealing position with the diaphragm maintaining the flow through the cleaner substantially constant.

Figure 4:
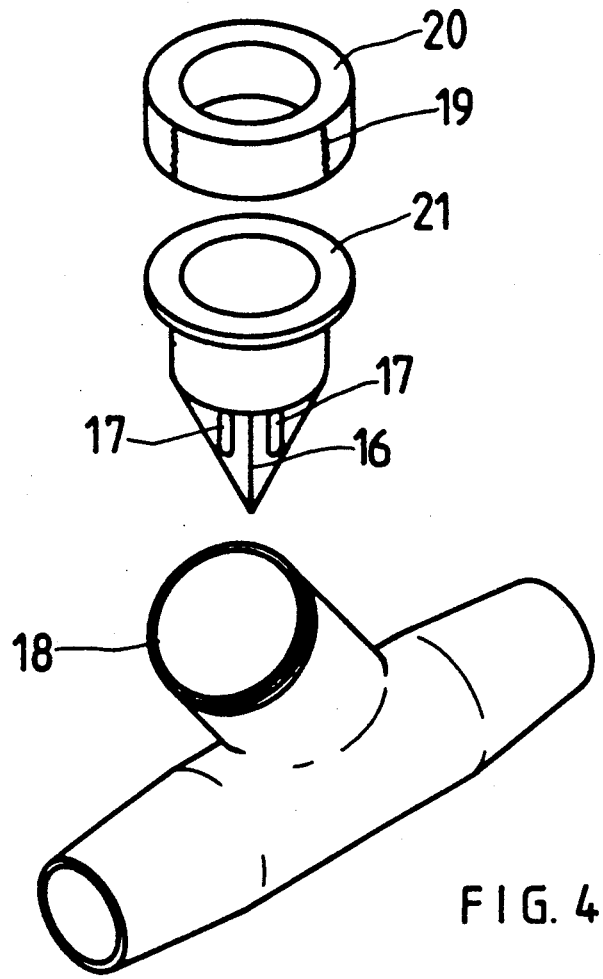
FIG. 4 illustrates modifications to the embodiment of FIGS. 1 to 3.

In the alternative embodiment illustrated in FIG. 4 the relief valve does not have the feature providing relief flow out of the by pass passage.

Also stiffening ribs (17) are provided on the parts of the diaphragm between the slits (16). This tends to promote uniform opening of the diaphragm between the slits during operation of the valve. Also in this form the surfaces of the diaphragm between the slits are made flat.

Also in this embodiment the end (18) is screwthreaded to receive a nut (19) having an inwardly extending flange (20).

The peripheral flange (21) is held between the flange (20) of nut (19) and the open end of the bypass passage.

The invention provides a simple construction which materially assists in maintaining a constant induced flow through a swimming pool cleaner in particular with the additional feature, where desired, of relief flow.

What we claim as new and desired to secure by Letters Patent is:

1. A relief valve comprising:
   (a) a body;
   (b) a flow passage through said body having an inlet and an outlet for connection to a pipe having an induced flow therethrough;
   (c) a bypass passage through said body connected to the flow passage and open to ambient conditions at a free end; and
   (d) a flexible resilient diaphragm that slides coaxially within the bypass passage and having a peripheral flange forming a seal against the free end of the bypass passage at ambient conditions and perforations permitting flow therethrough in only one direction and variable in size depending upon the degree of flexing of the diaphragm.

2. A relief valve as claimed in claim 1 in which the perforation is formed by a plurality of slits through the diaphragm extending from the axis outwardly along lines of junction between adjacent surfaces.

3. The relief valve of claim 8 in which the diaphragm is tubular, open at one end, the peripheral flange enables the diaphragm to be retained in position in the bypass passage and the diaphragm has a perforation through the closed opposite end.

4. A relief valve as claimed in claim 3 in which the diaphragm converges at the closed end towards its longitudinal axis.

5. A relief valve comprising:
   (a) a body;
   (b) a flow passage through said body having an inlet and an outlet for connection to a pipe having an induced flow therethrough;
   (c) a bypass passage through said body connected to the flow passage and open to ambient conditions at a free end and having longitudinal guiding means on its inner surface and a restriction at the free end; and
   (d) a flexible resilient diaphragm that slides coaxially within the bypass passage and having a peripheral flange forming a seal against the free end of the bypass passage at ambient conditions, the perforations permitting flow therethrough in only one direction and variable in size depending upon the degree of flexing of the diaphragm, and cooperating members movable in the guiding means to prevent complete withdrawal of the diaphragm from the bypass passage.

* * * * *